Jan. 20, 1942.    W. C. HANSEN    2,270,589
WINDSHIELD WIPER
Filed Aug. 22, 1939    3 Sheets-Sheet 1
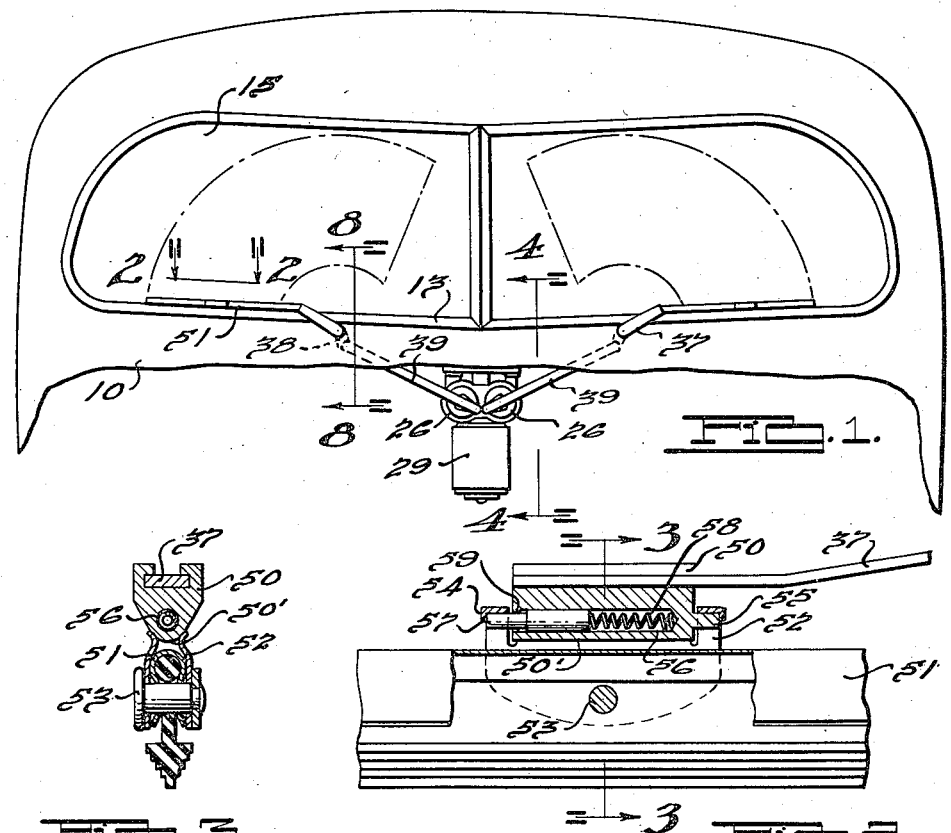
INVENTOR
Wray C. Hansen.
BY Harness, Dind, Patee & Harris
ATTORNEYS.

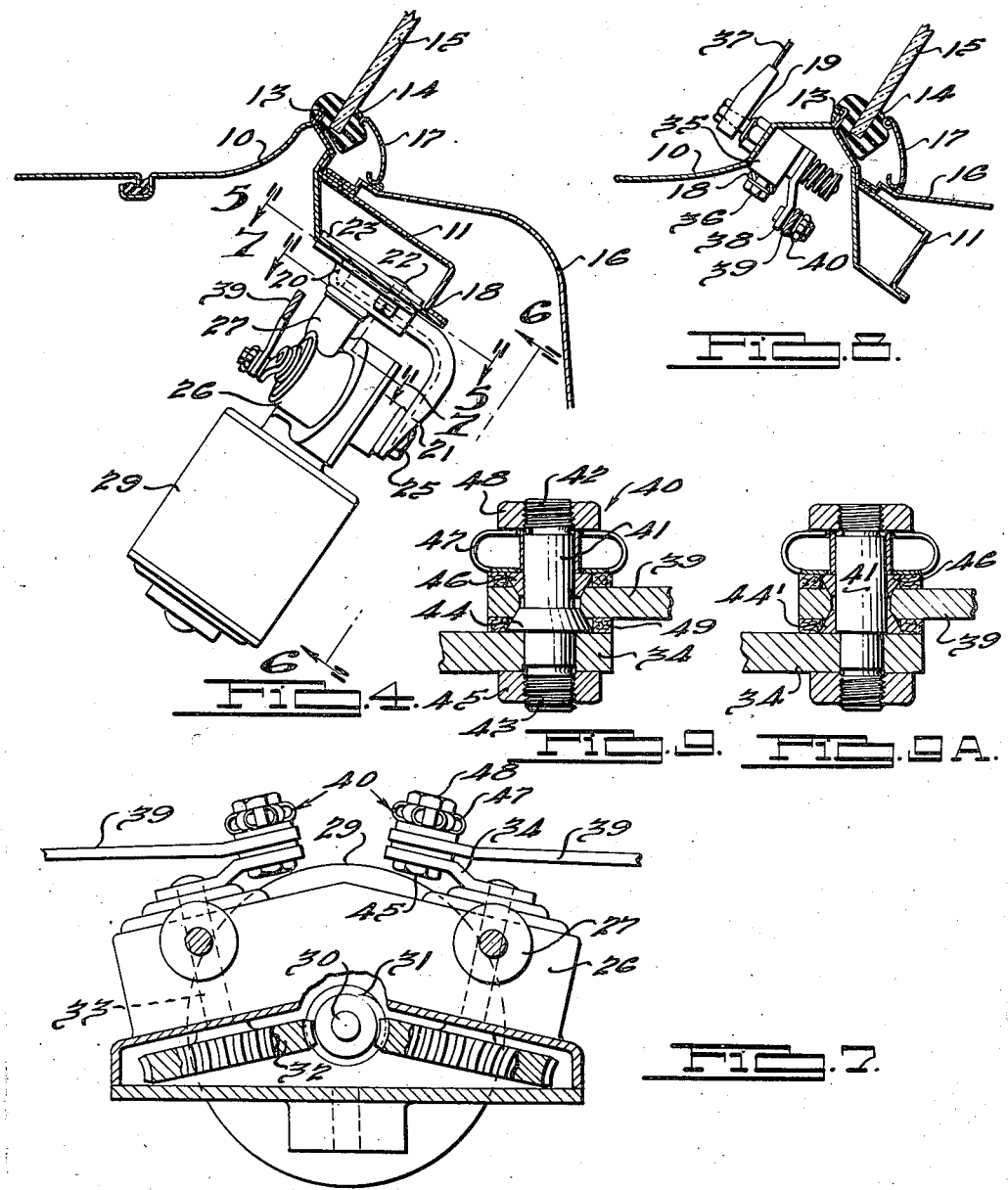

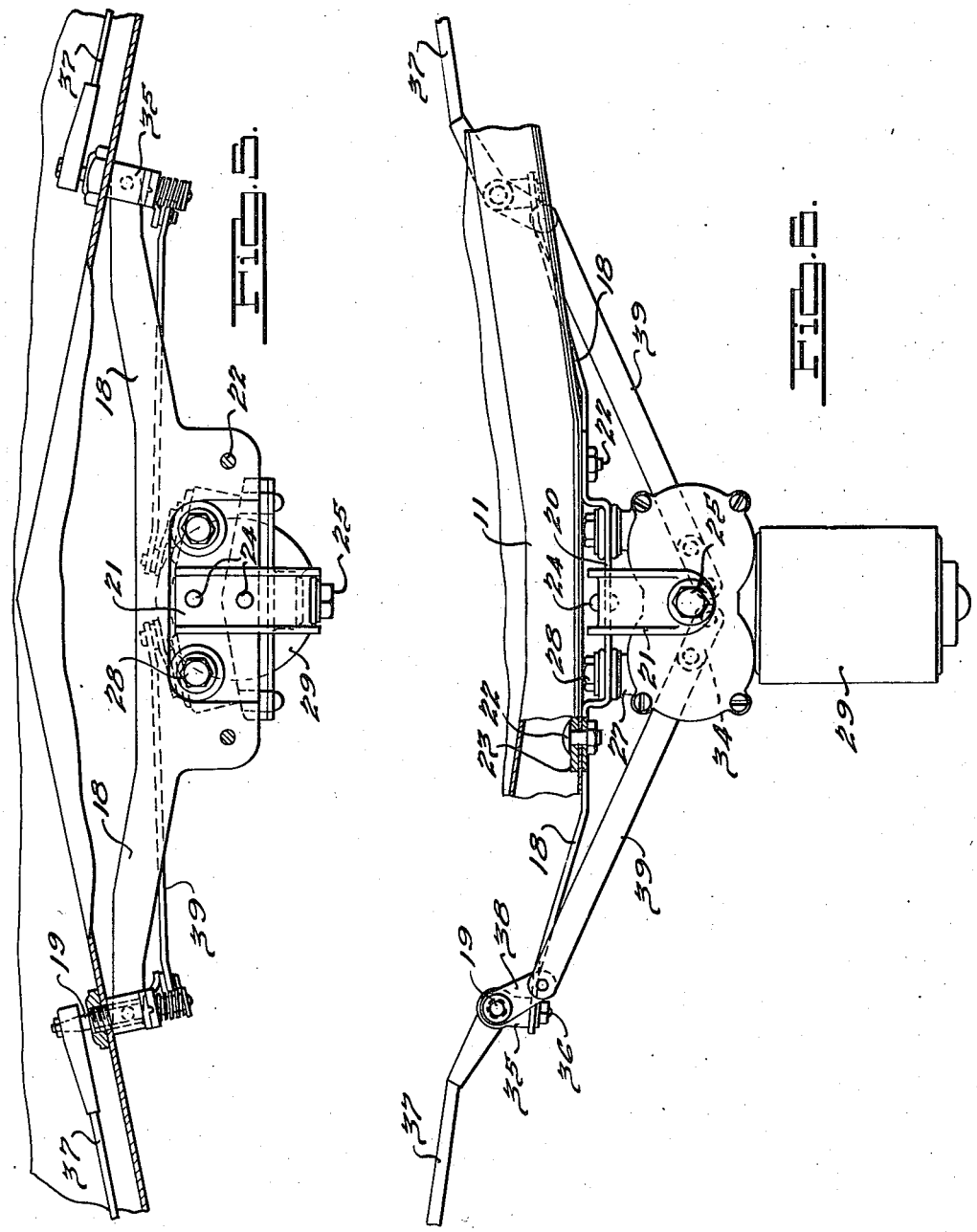

Patented Jan. 20, 1942

2,270,589

UNITED STATES PATENT OFFICE 2,270,589

WINDSHIELD WIPER

Wray C. Hansen, Highland Park, Mich., assignor to Chrysler Corporation, Highland Park, Mich., a corporation of Delaware Application August 22, 1939, Serial No. 291,384

1 Claim. (Cl. 15—255)

This invention relates to improved windshield wiper mechanism.

More particularly, the invention pertains to mechanism for actuating a pair of windshield wiper blades each of which operates upon one of a pair of relatively angularly disposed sections of a V-shaped windshield.

The principal object of the invention is to provide improved windshield wiper operating mechanism which may be conveniently accommodated between the dash and instrument panel of a motor vehicle in the vicinity of the converging edges of the sections of a V-type windshield.

A further object of the invention is to provide in mechanism of the kind described a driving element which is adapted to drive a pair of systems of linkages which operate respectively in a pair of converging planes substantially parallel to the planes of the corresponding windshield sections without imposing any strains on the parts of the linkage that will tend to cause binding.

A still further object is to provide an improved windshield wiper operative mechanism which may be pre-assembled and tested before it is attached to the vehicle.

An additional object of the invention is to provide a mechanism of the class described which is rugged and durable and yet economical to manufacture.

A still further object is to provide an improved connection between the crank arm and drive link which will permit some degree of universal movement of the arm to accommodate misalignment due to manufacturing tolerances without looseness.

A still further object is to provide an improved means for fastening the wiper blade to the arm which will accommodate rocking of the blade relative to the arm without noise and which will permit the blade to be easily and readily detached from the arm.

Other objects and advantages of the invention will be apparent from the following description.

Reference is now made to the accompanying drawings which illustrate preferred embodiments of the device.

In the drawings in which like reference characters designate corresponding parts in the following specification, Fig. 1 is a fragmentary, front elevational view of an automobile showing the positions of the various parts of the windshield wiper mechanism.

Fig. 2 is a view of the wiper blade and arm connection, partly in section, as seen when looking in the direction indicated by the arrows 2—2 on Fig. 1.

Fig. 2A is a view similar to Fig. 2, but showing a modified form of the connection.

Fig. 3 is a sectional view along line 3—3 of Fig. 2.

Fig. 3A is a sectional view along the line 3A—3A of Fig. 2A.

Fig. 4 is an elevational view along line 4—4 of Fig. 1, showing some of the body parts in section.

Fig. 5 is a plan view of the wiper operating mechanism taken generally along line 5—5 of Fig. 4.

Fig. 6 is an elevational view of the operating mechanism taken along line 6—6 of Fig. 4.

Fig. 7 is a view along line 7—7 of Fig. 4 showing the gear box.

Fig. 8 is a part sectional view of the vehicle cowl structure taken at the point where the wiper blade drive mechanism protrudes through the panel, the latter being shown in elevation.

Fig. 9 is an enlarged sectional view of the connection between the crank arm and drive link.

Fig. 9A is a view like Fig. 9, but of a modified form of connection.

Referring particularly to Figs. 1, 4, 5 and 6, it may be seen that the vehicle body cowl structure 10 has a reinforcing brace member 11 of box section form extending transversely thereof. This brace member has an upwardly extending tab spot welded at 13 to a corresponding tab of the cowl panel and forming a seat for a rubber sealing member 14 in which the windshield glass panel 15 is seated. A panel 16 is spot welded to the member 11 and is extended downwardly to form the instrument panel (not shown). A molding 17 conceals the joint between the panel 16 and the brace 11.

Fastened to the brace member 11 at the center thereof is an elongated base member 18 which constitutes a sub-frame, on which the entire windshield wiper apparatus is mounted. The base member 18 has an enlarged central portion and narrow laterally extending portions which terminate at each side of the cowl at the location of the wiper arm pivot shafts 19. The central portion is depressed at 20 to accommodate a bracket 21, the latter being riveted to the base 18 at 24.

The base 18 is fastened to the brace member 11 by bolts 22 which extend through the lower web of the member 11, through the member 18 and through a stiffening piece 23 provided at this point for added strength.

The bracket 21 is fastened at 25 to the gear housing 26 of the wiper prime mover unit, the latter also being provided with a pair of upstanding lugs 27 fastened to the depressed portion 20 of the base member 18, suitable rubber washers being provided to absorb vibration.

The prime mover comprises an electric motor 29 suitably fastened to the gear box 26. Any other desired type of motor may be substituted without departing from the principles of the invention. The motor shaft 30 has a worm 31 attached to the upper end thereof, this worm being in mesh with a pair of worm wheels 32. The latter are carried by shafts 33 suitably bearinged in the housing or box 26 at a divergent angle with respect to each other. Each of the shafts 33 has a crank arm 34 fixed thereto for actuation thereby.

Referring now to Figs. 5, 6 and 8, it will be seen that a bushing 35 is fastened to each laterally extended end of the base 18 by a bolt 36. Each bushing 35 rotatably carries a shaft 19 on the outer end of which the wiper arm 37 is mounted, any suitable type of connection known to the art being employed. The inner end of each of the shafts 19 carries a crank arm 38, the connection between the shaft 19 and arm 38 consisting of a spring loaded clutch of the well-known and widely used type. The crank arms 38 are respectively connected to the crank arms 34 by a pair of actuating links 39.

At each of the points of connection of the aforesaid elements, a yieldable connection, generally referred to at 40, is employed.

The connection 40 consists of a pin 41, threaded at 42 and 43 and having a tapered washer 44 formed integrally thereon. The crank 34 is rigidly secured to the pin 41 by a nut 45, and the link 39, which is provided with a double countersunk hole, is rotatably secured between the washer 44 and a second tapered metal washer 46, the latter being slidable, but non-rotatable, upon the pin 41, as illustrated in Fig. 9. Any suitable means such as a key and slot may be utilized to provide a slidable but non-rotatable connection between the washer 46 and the pin 41. The assembly is resiliently retained in proper relation by means of a spring washer 47 which is in turn secured on the pin by a nut 48. A pair of felt washers 49 surround the tapered washers 44—46 and insulate the assembly against dust and dirt as well as prevent the link 39 from rubbing on any of the other parts.

The above-described connection 40 possesses several advantages, i. e., it permits some degree of universal movement between the crank 34 and the link 36 which automatically compensates for any misalignment of the parts due to manufacturing tolerances, etc., it is sealed against dirt, any looseness resulting from wear is automatically taken up by the spring washer 47 which is put under compression during assembly, it is easy to assemble and economical to manufacture.

The connections between the cranks 38 and the other ends of the links 39 are preferably like that just described for the connection between the members 34 and 39.

Fig. 9A illustrates a modified form of connection which is the full equivalent of that shown in Fig. 9 except that the lower bearing washer, designated 44' in Fig. 9A, is a separate member suitably secured to the pin 41. If desired, in either of the structures shown in Figs. 9 and 9A, the bearing washers 44, 46 and for 44' may be of oil impregnated sintered material (such as that known to the trade as "Oilite").

The angle between the two driving shafts 33 should be approximately equal to the angle between the two panels of the V-windshield of the vehicle on which the windshield wiper is to be used. It is obvious that the apparatus herein described may be easily adapted for use on vehicles having any desired angular relationships between the windshield panels; the only change necessary to accommodate a windshield of different angular characteristic being the provision of a gear housing with the holes for the shafts 33 properly disposed. This advantage is of importance in the production of wiper mechanisms for cars of different makes and results in economies in manufatcure. The worm wheels 32 may of course bear any desired relationship to each other without disturbing the driving relation therebetween or between the wheels and the worm 31.

Another important advantage of the apparatus so far described resides in the fact that it is possible to completely assemble the wiper on the base member 18 and test it before the apparatus is assembled upon a vehicle. Thus, all adjustments such as those incident to equalization of the stroke of the blades, setting of the motor to stop with the blades in parked position, etc., may be performed on the test bench. This relieves the necessity of performing such operations on the assembly line.

Referring back to Figs. 2 and 3 which illustrate one preferred form of attaching means between the blade and the wiper arm, it may be seen that the wiper arm 37 is provided at its end with an attaching lug 50. According to the practice in the art, the blade is connected to the carrying arm in such a manner as to permit the blade to tilt or flop over at the end of each stroke whereby the blade will drag over the surface of the windshield at the proper inclination to avoid chattering. It is necessary also to provide a connection between the blade and arm that is readily detachable without the use of tools so as to permit easy removal of the blade for replacement or other purposes.

In the devices of the prior art, various expedients have been resorted to in an endeavor to provide a satisfactory connection which is easily detachable and which permits the necessary flop-over action. The resulting structures have been generally unsatisfactory in that the connections have been objectionably loose and the flop-over action has been accompanied by undesirable noise.

The connection illustrated in Figs. 2 and 3 overcomes the aforementioned disadvantages. The blade, designated generally at 51, is provided at its central portion with a U-shaped clip 52 attached to the blade 51 by a rivet 53 in a manner permitting slight pivotal movement about the axis of the rivet. The clip 52 is cut out at the center thereof to receive the lug 50 which has a rounded bottom portion 50' adapted to seat between the outwardly directed walls of the clip 52 as shown in Fig. 3. The clip is bent over at each end, as indicated at 54 and the lug 50 is provided with a round projection 55 which is adapted to seat in the U-shaped opening at one end of the clip 52. The lug is also provided with a bore 56 in which is disposed a slidable pin 57 urged outwardly of the bore by a spring 58. The pin 57 has a reduced outer portion which is adapted to seat in the U-shaped opening at the other end of the clip. The pin 57 is retained against escape from the bore 56 by the annular peaned edge portion 59.

As can be seen from Fig. 2, the blade 51 may be readily removed from the arm 37 by pushing the pin 57 into the bore 56 by means of a pencil, match or other suitable article. To attach the blade to the arm it is only necessary to depress the pin 57 against the spring 58, seat the projection 55, then allow the pin 57 to snap into position. During operation of the wiper, the blade may flop over at the end of each stroke, this action being accommodated without looseness or noise by the sliding contact between the rounded surface 50' and the clip 52.

Figs. 2A and 3A illustrate a slightly modified form of connection. The parts shown in Figs. 2A and 3A are identical to those of Figs. 2 and 3 except that the clip 52 has a rubber lining 60 along its central cut out portion. The rubber lining 60 is adapted to contact the rounded surface 50' of the lug 50 upon assembly of the blade upon the arm and assists in maintaining the connection tight while yieldably permitting the flop-over action.

Having thus described my invention, that which I claim as new and desire to secure by Letters Patent is set for in the appended claim.

I claim:

Dual windshield wiper mechanism for wiping each of the panels of a V-type windshield comprising a base member having a central portion for receiving a driving mechanism and a pair of laterally extending arms for receiving at the extremities thereof driven mechanisms, a prime mover unit including a motor, a shaft driven by said motor, a worm mounted on said shaft, a pair of worm wheels meshed with said worm, shafts driven by said worm wheels, a crank arm on each shaft, a pair of bushings pivotally mounted at the ends of said laterally extending arms, driven shafts journalled in said bushings, a crank on each of said driven shafts, a link connecting one of the crank arms on the shaft driven by one of said worm wheels with the crank arm on the shaft in one of said bushings, a link connecting the other pair of said cranks, all of the aforesaid mechanism being mounted as a unitary assembly underneath the cowl of a motor vehicle with said bushings in contact with the under side of the cowl and the shafts therein extending through the cowl and wiper arms on said last named shafts externally of said cowl, said bushings being adjustable by means of said pivotal mountings to accommodate variations in the angular relation of the panels of said V-type windshield.

WRAY C. HANSEN.